March 3, 1970  A. M. DICCIANNI  3,498,687
MOVABLE ACCESS PANELING FOR ULTRA CLEAN WORK STATIONS
Filed July 18, 1968  2 Sheets-Sheet 1

INVENTOR.
Anthony M. Diccianni
BY
ATTORNEY

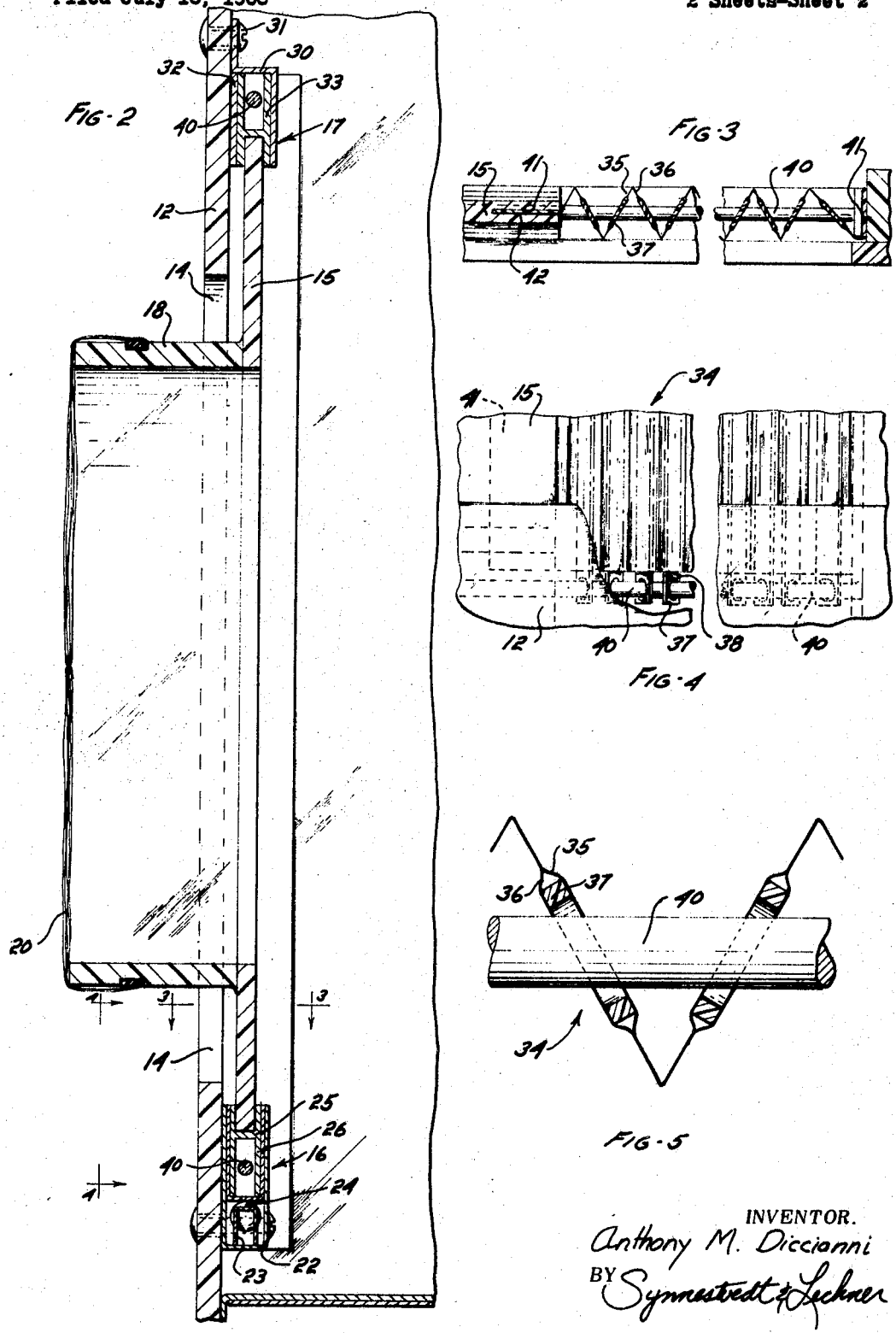

United States Patent Office 3,498,687
Patented Mar. 3, 1970

3,498,687
MOVABLE ACCESS PANELING FOR ULTRA
CLEAN WORK STATIONS
Anthony M. Diccianni, Norristown, Pa., assignor to Air
Control, Inc., Norristown, Pa., a corporation of Pennsylvania
Filed July 18, 1968, Ser. No. 745,855
Int. Cl. A61g 11/00
U.S. Cl. 312—1         8 Claims

ABSTRACT OF THE DISCLOSURE

An ultra clean work station is disclosed which has an enclosed work area to which access is provided by access paneling mounted for sliding movement lengthwise of the work area. Portage in the paneling provides for access by the arms and hands of the workman. Accordian pleated collapsible panels are secured to the sides of the access paneling and cover the opening not occupied by the paneling.

This invention relates to clean air work stations of the general kind provided with filtering means for providing an ultra clean work area and is more particularly concerned with arm port paneling construction especially adapted for such stations.

A relatively recent requirement of modern technology is the provision of contamination-free controlled atmosphere environments for micro-structure manufacture and for numerous laboratory processes and inspection procedures. Specifically, such equipment is used in the development and manufacture of solid state circuit elements, vapor deposit components, subminiature mechanisms and in the manufacture of many other devices required by the space and other industries where dust and other contaminant particles down to .3 microns and even smaller must be eliminated.

Although the present invention has utility other than in the foregoing applications, it is primarily intended for use in conjunction with equipment of the kind referred to, and especially as a part of a console type work station or work bench providing such ultra clean work areas or other controlled atmosphere enclosures.

Many manufacturing operations carried out in clean work stations are so critical as to require that the work area be substantially completely isolated from the surroundings. When such is the case, access to the enclosure is provided through arm ports fitted with plastic sleeves, rubber gloves or the like. The advantages of complete isolation and an ultra clean environment can be maintained with such units, even in relatively dirty areas. An additional advantage arises because the atmosphere within the unit is constantly recycled through the absolute filter, with little addition of make up air, so that the filter life can be prolonged by as much as three to four times normal life expectancy. A further advantage of such units is the protection afforded the operator from the presence of harmful fumes or other contaminants which might result from the particular work to be done in the work area.

Despite the advantages provided, such units do make it difficult for a workman to efficiently carry out many tasks within the enclosure inasmuch as hand and arm movements are quite restricted.

With this in mind, an important object of the invention is the provision of means for providing substantially complete isolation of the work area and at the same time allows for a high degree of freedom of movement for the hands of the workman.

A related and more specific object of the invention is the provision of movable access paneling for a clean air work enclosure, thereby allowing for movement of the hands of the workman to different positions lengthwise of the work area surface.

Preferably, the aforementioned and various other objects which will appear hereinafter are achieved by providing a substantially rectangular opening in the front wall of the enclosure adjacent the work surface. Access paneling, substantially smaller in width than the width of the rectangular opening is provided therein for slidably mounted movement to different positions lengthwise of the opening. The paneling is provided with access portage through which the arms of a workman can be extended. Desirably, the portage is ordinarily sealed by iris closure members, the openings of which can be adjusted to fit around the arms of a workman or by rubber or plastic gloves or sleeves which permit access while substantially eliminating the flow of outside air into the work area.

The invention further provides collapsible panels which are secured to the sides of the access paneling and to the front wall adjacent the rectangular opening. These are arranged so that they cover the portions of the opening not covered by the access paneling and are yieldable or collapsible to permit movement of the paneling and thus the arms of the workman to different positions lengthwise of the work surface.

The manner in which the various objects and advantages of the invention are achieved will be fully apparent from the following description of a preferred embodiment of the invention as illustrated in the accompanying drawings in which:

FIGURE 2 is a section taken along lines 2—2 of FIGURE 1;

FIGURE 3 is a section taken along lines 3—3 of FIGURE 2;

FIGURE 4 is a fragmentary view showing a portion of the front of the unit as viewed in the direction indicated by the arrows 4—4 of FIGURE 2; and FIGURE 5 is an exploded view of a detail of the means for mounting the collapsible panels.

Figure 1:
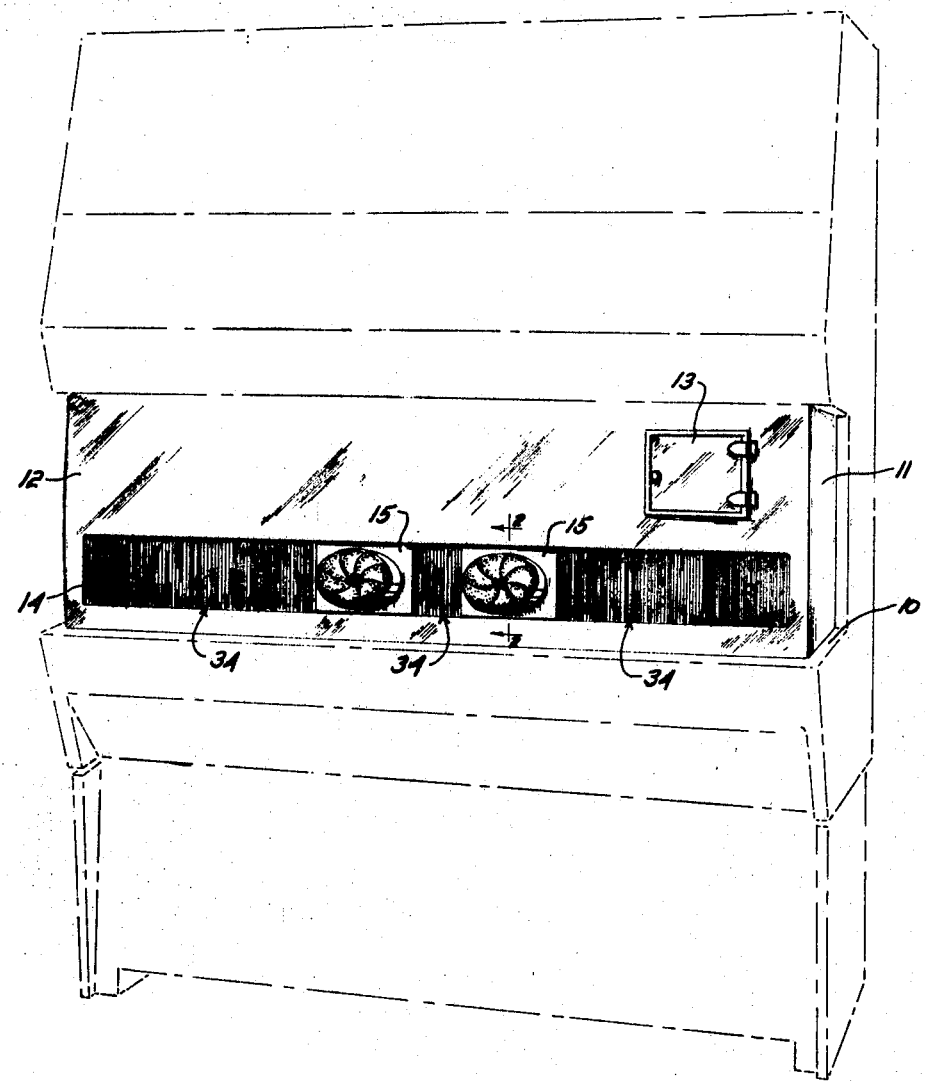
FIGURE 1 illustrates the invention as embodied in a conventional commercially available clean air work station.

Attention is first directed to FIGURE 1 for a showing of a prefered form of the invention as embodied in a commercially available console type laminar flow clean air work station. As will be evident to those skilled in the art, laminar flow work stations of the kind referred to are, in general, comprised of an enclosure for a work surface, and means including a blower, an absolute filter and circulating ducts for delivering cleansed air to the work area in the imediate vicinity of the work surface. Preferably, the filter medium removes all particles from the airstream smaller than about 0.3 micron. In most cases, the filter is constructed and arranged so that the air delivered to the work area has laminar flow characteristics so that the work at the work station is efficiently cleansed of undesirable contaminants.

In accordance with the present invention, the unit is provided with a work surface 10 which is enclosed by side panels, one of which is shown at 11 and a front wall 12. Front wall 12 is substantially completely formed of a transparent material such as polymethylmethacrylate thereby providing for visual inspection of the work on the work surface 10. The wall 12 may also be provided with one or more access doors 13 through which work pieces may be passed. Typically, the front wall is secured in place by quick release type fasteners in order to provide access for larger pieces of equipment and for cleaning or repair of the unit.

In a unit of the kind illustrated, the flow of air is directed downwardly in the work area and passes through exhaust openings in the bench top which lead to the input of the blower. Thus, the air is continuously recirculated through the filter.

The front wall 12 is also provided with a relatively large retangular opening 14 which is located just above the work surface 10 and extends lengthwise thereof.

According to the invention, the rectangular opening 14 is closed off by means including access paneling which is provided with access portage, and which is slidably mounted for movement lengthwise of the work surface 10. Although a single slidably mounted acces panel will sufice in many instances, maximum advantage of the intion is gained when the access paneling comprises a pair of access panels 15, each of which fits within the opening 14 and is independently mounted for sliding movement to different positions along the work surface by means of guide structure, generally indicated in FIGURE 2 by the reference characters 16 and 17. Access portage through which the arms of a workman may be extended is provided in the access paneling. When two panels are employed, one port 18 is provided in each panel 15. Each port is normally closed by any suitable means such as an iris port closure member diagrammatically illustrated in FIGURES 1 and 2 and identified by the reference character 20. As will be understood by those skilled in the art, iris closure members of the kind described are so formed that upon manual rotation thereof, the opening therein is selectively opened or closed thereby providing just enough room for the arm of the workman to pass when access is desired. Other types of closure members such as rubber gloves or plastice sleeves may be substituted if desired.

The lower edge of each panel rides in track structure 16 which is comprised of U-shaped channel member 22 secured to the front wall by suitable fastener means. A U-shaped bearing carrier 23 is mounted within the channel 2, the latter being notched so as to support roller bearings 24.

Preferably, the lower edge of each panel 15 is fitted with a framing member 25 which is H-shaped in cross section as viewed in FIGURE 2. A U-shaped channel fits over the downwardly extending legs of the H-shaped member. The bottom surface of this U-shaped channel provides the bearing surface which rides on the bearings 24.

Upper guide structure 17 typically consists of an elongated Z-shaped bracket 30 fastened to the front wall 12 by fasteners 31 located at suitable intervals. A strip 32 abuts the lower surface of the web or bracket 30. An H-shaped framing member 33 similar in construction to member 25 is fitted at the upper edge of each of the access panels and rides within the guide track formed by the bracket 30 and the strip 32. With this structure just described, it can be seen that the access panels can be easily moved when desired by the operator to different positions lengthwise of the work surface within the limits of the length of the elongated rectangular opening 14.

An important feature of the invention lies in the provision of collapsible panels 34 which fill the space within the rectangular opening not covered by the access paneling. The collapsible paneling is preferably comprised of accordian pleated sheeting material, the pleats of which extend in lines parallel to the sides of the access paneling. According to the preferred mode of carrying out the invention, the sheeting material is formed of transparent vinyl film sheets 35 and 36 between which are sandwiched elongated stiffening members 37, also made of a plastic material.

The vinyl film has proven to be well adapted to the purposes intended, being tough and easily foldable while at the same time providing sufficient transparency so as to not unduly hamper inspection of the interior of the closure.

The collapsible panels are guided in the following manner. Each of the stiffening members 37 is provided with circular openings 38 adjacent its ends, the lowermost ends of representative stiffening members being shown in FIGURE 4. According to the invention, elongated guide rods 40 are mounted so as to fit within the space between the legs of the H-shaped frames 25 and 33. The guide rods 40 extend lengthwise of the opening 14 and of the guide structure 16 and 17 and are supported by the front wall 12 by suitable support members, not shown.

As can best be seen in FIGURE 3, the sides of the collapsible panels are secured to the sides of the access panels and to bars adjacent the sides of the rectangular opening. Preferably, plastic strips 41 are sandwiched between the vinyl sheets at each end of a collapsible panel. The strips 41 when covered by the plastic sheeting are press fitted into narrow grooves 42 in the access panels and thereby hold the sheeting firmly in place. In the case of the central collapsible panel, that is, the portion between the two panels 15, both ends or sides are secured to side walls of the panels.

From the foregoing, it can be seen that exceptional freedom of movement of the arms of the workman is provided by the present invention inasmuch as the collapsible panels permit movement of the access panels from one end of the work surface to the other without sacrifice of the advantages of isolation heretofore provided by these units. When the access paneling is comprised of two separate panels as in the illustrative embodiment, still further freedom of movement is provided in that the arms and thus the workman's hands can be moved apart or together.

The invention has thus proven to be very effective in providing substantially complete isolation of the work area from the ambient atmosphere without sacrifice of the freedom of movement required on the part of the operator. It possesses the virtue of simplicity and accomplishes its results without interference with other work areas surrounding the work station. In addition, the features of the invention can be readily incorporated into practically all conventional work station designs and has additional utility in a variety of other applications requiring isolation of a workman or of the surrounding atmosphere from a work area.

I claim:

1. In a clean work station or the like comprising an enclosure for isolating a work area from ambient atmosphere, said enclosure including a transparent wall providing visual observation of the work area and a relatively wide rectangular opening in said transparent wall; access paneling in said opening, said access paneling having a width substantially smaller than the width of the rectangular opening and having access portage therein through which the arms of a workman can be extended, means mounting said access paneling for movement from side to side of the larger rectangular opening, thereby permitting shifting of the hands of the workman to desired positions within the work area, and panels of a collapsible sheeting material secured to the side edges of the access paneling closing those portions of the rectangular opening not covered by the access paneling, said collapsible panels permitting movement of the access paneling relatively of the work area.

2. Apparatus according to claim 1, wherein said collapsible panels are pleated along lines extending perpendicular to the direction of movement of the access paneling.

3. Apparatus according to claim 2, wherein said pleated material comprises a pair of sheets of transparent material secured together along the lines defining the pleats and elongated stiffening members each sandwiched between the sheets defining the pleats.

4. Apparatus according to claim 3 further including a pair of guide rods extending lengthwise of the rectangular opening adjacent the top and bottom thereof, guide openings at the ends of said elongated stiffening members, said guide openings fitting on said guide rods and further including guide tracks for said access paneling.

5. A clean work station including a horizontally extending work surface, an enclosure for the work area above said surface, said enclosure including a substantially vertically extending front wall, said wall having at least a portion formed of a transparent material providing for visual observation of the work area, an enlarged rectangular opening in the front wall above the work surface extending lengthwise thereof, paneling mounted in said opening have access portage through which the arms of a workman can be extended, the width of said paneling being substantially less than the width of the opening, guide structure extending lengthwise of said enlarged opening for guiding said paneling for movement lengthwise of the work surface thereby permitting shifting of the hands of a workman to different positions along the work surface, and collapsible panels secured to the sides of said paneling, said collapsible panels covering the portions of said rectangular opening not covered by the paneling and permitting movement of the panel means to different positions lengthwise of the work surface.

6. A clean work station according to claim 5 wherein said paneling comprises a pair of rectangular panels, each rectangular panel being movable independently of the other and each being provided with an access port.

7. A clean work station according to claim 5 wherein said paneling comprises a single access panel and wherein said access portage comprises a pair of ports located in side-by-side relationship in said panel.

8. A clean work station according to claim 5 wherein said collapsible panels consist of an accordian pleated material, the pleats thereof extending in vertical planes.

References Cited

UNITED STATES PATENTS

| | | | |
|---|---|---|---|
| 3,084,684 | 4/1963 | Saunders | 312—1 |
| 3,111,076 | 11/1963 | Martin et al. | 160—84 X |
| 3,265,059 | 8/1966 | Matthews | 128—1 |

FRANK L. ABBOTT, Primary Examiner

P. C. FAW, Jr., Assistant Examiner

U.S. Cl. X.R,

128—1; 160—84